(12) United States Patent
Tolbert et al.

(10) Patent No.: US 9,270,198 B2
(45) Date of Patent: Feb. 23, 2016

(54) CONTROL OF PARALLEL-CONNECTED CURRENT SOURCE RECTIFIERS

(71) Applicants: Leon Monroe Tolbert, Knoxville, TN (US); Ben Guo, Knoxville, TN (US); Fan Xu, Knoxville, TN (US); Fei Wang, Knoxville, TN (US); Benjamin J. Blalock, Knoxville, TN (US)

(72) Inventors: Leon Monroe Tolbert, Knoxville, TN (US); Ben Guo, Knoxville, TN (US); Fan Xu, Knoxville, TN (US); Fei Wang, Knoxville, TN (US); Benjamin J. Blalock, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 48 days.

(21) Appl. No.: 14/204,403

(22) Filed: Mar. 11, 2014

(65) Prior Publication Data

US 2014/0268934 A1 Sep. 18, 2014

Related U.S. Application Data

(60) Provisional application No. 61/847,409, filed on Jul. 17, 2013, provisional application No. 61/778,381, filed on Mar. 12, 2013.

(51) Int. Cl.
*H02M 7/219* (2006.01)
*H02M 7/23* (2006.01)
*H02M 7/217* (2006.01)

(52) U.S. Cl.
CPC ............... *H02M 7/219* (2013.01); *H02M 7/23* (2013.01); *H02M 7/217* (2013.01); *H02M 2007/2195* (2013.01); *Y02B 70/1408* (2013.01)

(58) Field of Classification Search
CPC ..... H02M 7/02; H02M 7/155; H02M 7/1555; H02M 7/1557; H02M 7/217; H02M 7/2173; H02M 7/2176; H02M 7/219
USPC ................. 363/34–37, 65, 67–70, 74, 78, 84, 363/88–89, 124–127
See application file for complete search history.

(56) References Cited

U.S. PATENT DOCUMENTS

| | | | |
|---|---|---|---|
| 2002/0172063 A1* | 11/2002 | Link | 363/132 |
| 2003/0058662 A1* | 3/2003 | Baudelot et al. | 363/37 |
| 2008/0219036 A1* | 9/2008 | Colombi et al. | 363/126 |
| 2009/0067206 A1* | 3/2009 | Oguchi et al. | 363/124 |
| 2012/0163045 A1* | 6/2012 | Fujita et al. | 363/37 |
| 2014/0119074 A1* | 5/2014 | Courtney et al. | 363/70 |

* cited by examiner

*Primary Examiner* — Jeffrey Gblende
(74) *Attorney, Agent, or Firm* — Kenyon & Kenyon LLP

(57) ABSTRACT

A three-phase alternating current (AC) to direct current (DC) converter may include a three-phase AC filter receiving a three-phase AC power supply, a plurality of three-phase current source rectifiers (CSR) connected in parallel with each other and connected to a three-phase AC filter, and an output filter connected to the CSR's to generate a DC output. Each of the CSRs may include six switches and a free-wheeling diode. Each of the three filtered AC inputs from the three-phase AC filter may be connected via a switch of the six switches to selectably send current into a positive line, and each of three filtered AC inputs from the three-phase AC filter may be connected via another switch of the six switches to selectably receive current from a negative line. The free-wheeling diode may have a cathode connected to the positive line and an anode connected to the negative line.

15 Claims, 7 Drawing Sheets

100

700

CONTROL OF PARALLEL-CONNECTED CURRENT SOURCE RECTIFIERS

CROSS-REFERENCE TO RELATED APPLICATIONS

This application claims benefit under 35 U.S.C. §119(e) of U.S. Provisional Application Ser. No. 61/778,381, filed Mar. 12, 2013, and U.S. Provisional Application Ser. No. 61/847,409, filed Jul. 17, 2013 which are incorporated herein by reference in entirety.

STATEMENT REGARDING FEDERALLY SPONSORED RESEARCH OR DEVELOPMENT

This invention was made with government support under grant nos. R01134380 and R011346021, awarded by the Department of Defense, and a grant from the National Science Foundation, Award No. EEC-1041877 and the CURRENT Industry Partnership Program. The U.S. Government has certain rights in this invention.

BACKGROUND

Three-phase current source rectifier (CSR) is a promising solution for power supply systems as the buck-type power factor correction converter. By converter paralleling, high power rating and system redundancy can be achieved. However, asymmetrical distribution of load current among converter modules may occur, which can increase power loss or even damage devices.

Therefore, there may be a need to control the imbalanced load current, or circulating current that flows between parallel CSR's in a three-phase alternating current (AC) to direct current (DC) converter, to fully realize the advantages of CSR's.

DETAILED DESCRIPTION

Figure 1:
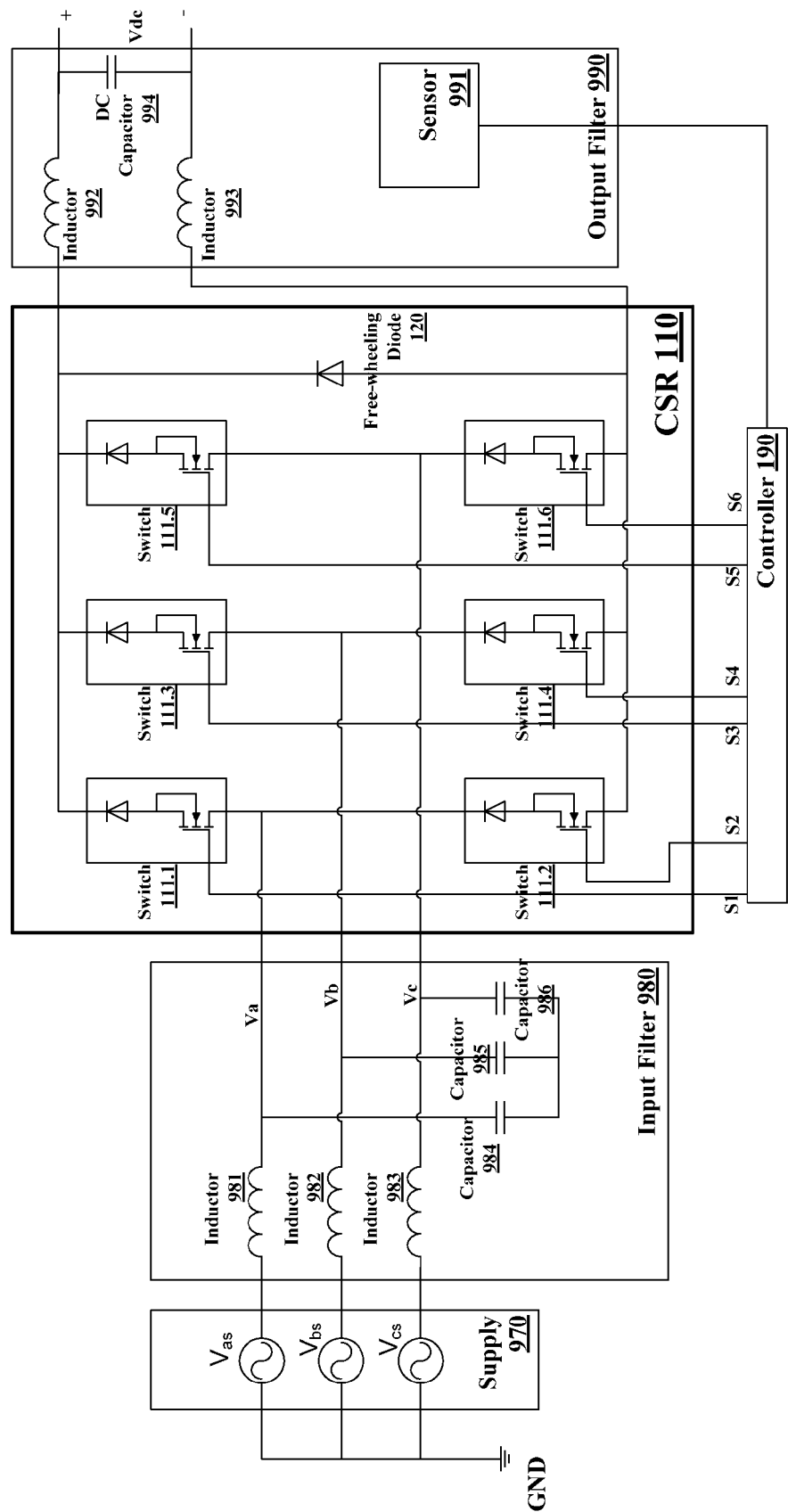
FIG. 1 illustrates a converter according to an embodiment of the present disclosure.

According to the embodiments of the present disclosure in FIG. 1, a three-phase alternating current (AC) to direct current (DC) converter 100 may include a three-phase AC filter (input filter) 980 receiving a three-phase AC power supply 970. A three-phase current source rectifier (CSR) 110 may be connected to the three-phase AC filter 980. An output filter 990 may be connected to the three-phase CSR 110 to generate a DC output Vdc (for example, 400 volts DC).

The supply 970 may generate 3 AC supplies Vas, Vbs, Vcs, (480 volts AC) relative to a ground GND. The input filter 980 may include 3 inductors 981-983 to generate three filtered AC inputs (Va, Vb, and Vc). Each of the three filtered AC inputs (Va, Vb, and Vc) nodes may be connected to a respective capacitor 984-986 to a common node. The output filter 990 may include positive inductor 992, negative inductor 993, and a DC capacitor 994.

The three-phase CSR 110 may include six switches 111.1-111.6 and a free-wheeling diode 120.

Each of the switches 111.1-111.6 may be controlled by a corresponding control signal S1-S6 from a controller 190.

Each of the three filtered AC inputs (Va, Vb, and Vc) from the three-phase AC filter 980 may be connected via a switch (111.1, 111.3, 111.5) to selectably send current into a positive line (connecting to inductor 992), and each of three filtered AC inputs (Va, Vb, and Vc) from the three-phase AC filter 980 may be connected via another switch (111.2, 111.4, 111.6) of the six switches to selectably receive current from a negative line (connecting to inductor 993).

The free-wheeling diode 120 may have a cathode connected to the positive line and an anode connected to the negative line, so that current may only flow from the negative line to the positive line through the free-wheeling diode 120.

Each of the six switches 111.1-111.6 may comprise a MOSFET and a diode connected in series, such that each switch when turned on may only allow current flow in one direction.

The three-phase CSR 110 may be controlled by a controller 190.

Figure 3:
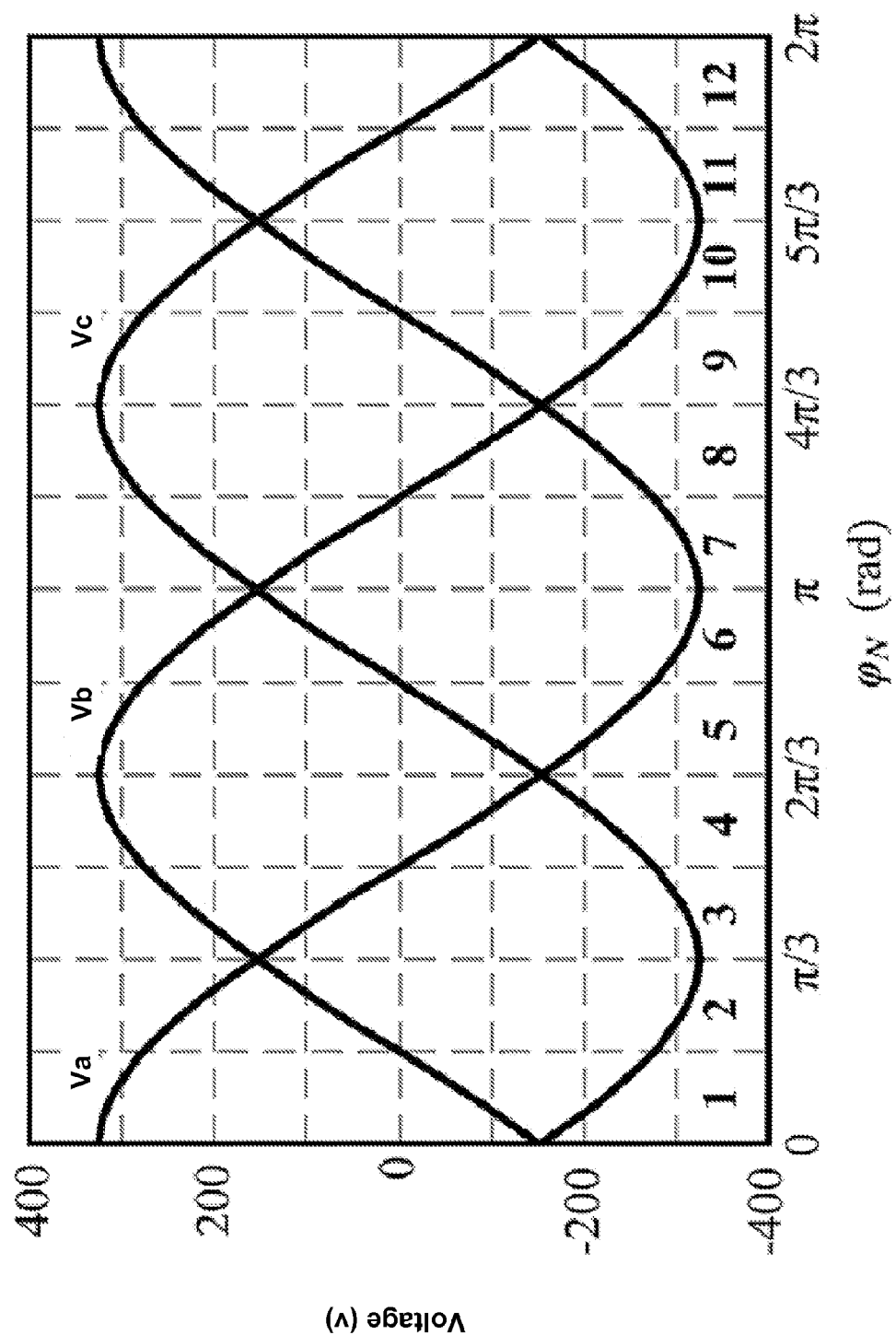
FIG. 3 illustrates a plot of a three-phase AC supply's voltages as divided into twelve phase sectors in a single cycle of the three-phase AC supply according to an embodiment of the present disclosure.

The controller 190 may determine a present phase sector from a plurality of phase sectors (as illustrated in FIG. 3) of the three filtered AC inputs (Va, Vb, and Vc), corresponding to the current phase of the filtered AC inputs.

A sensor 991 may measure the voltages of the three filtered AC inputs (Va, Vb, and Vc), a voltage of the DC output Vdc and currents through the positive line and the negative line of the three-phase CSR 110.

The controller 190 may generate control signal sequences to selectably turn on the switches 111.1-111.6 of the three-phase CSR 110 to have one zero-state in each of a plurality of a switching period within the present phase sector.

The controller 190 may control the duration of the zero-state of the control signal sequences based upon the voltage of the DC output and the currents through the positive line and the negative line of the three-phase CSR 110.

At least one of the MOSFETs of the switches 111.1-111.6, the diodes of the switches 111.1-111.6, and the free-wheeling diode 120 may be a wide-band gap (WBG) device, such as a Silicon Carbide based device. At least one of the diodes of the switches 111.1-111.6 and the free-wheeling diode 120 may be a Schottky diode.

The controller 190 may include a processor, a Space Vector Modulator (SVM), a memory storing instructions and historical performance data of the converter, A/D converters, digital signal processor (DSP), etc. (not shown).

Figure 2:
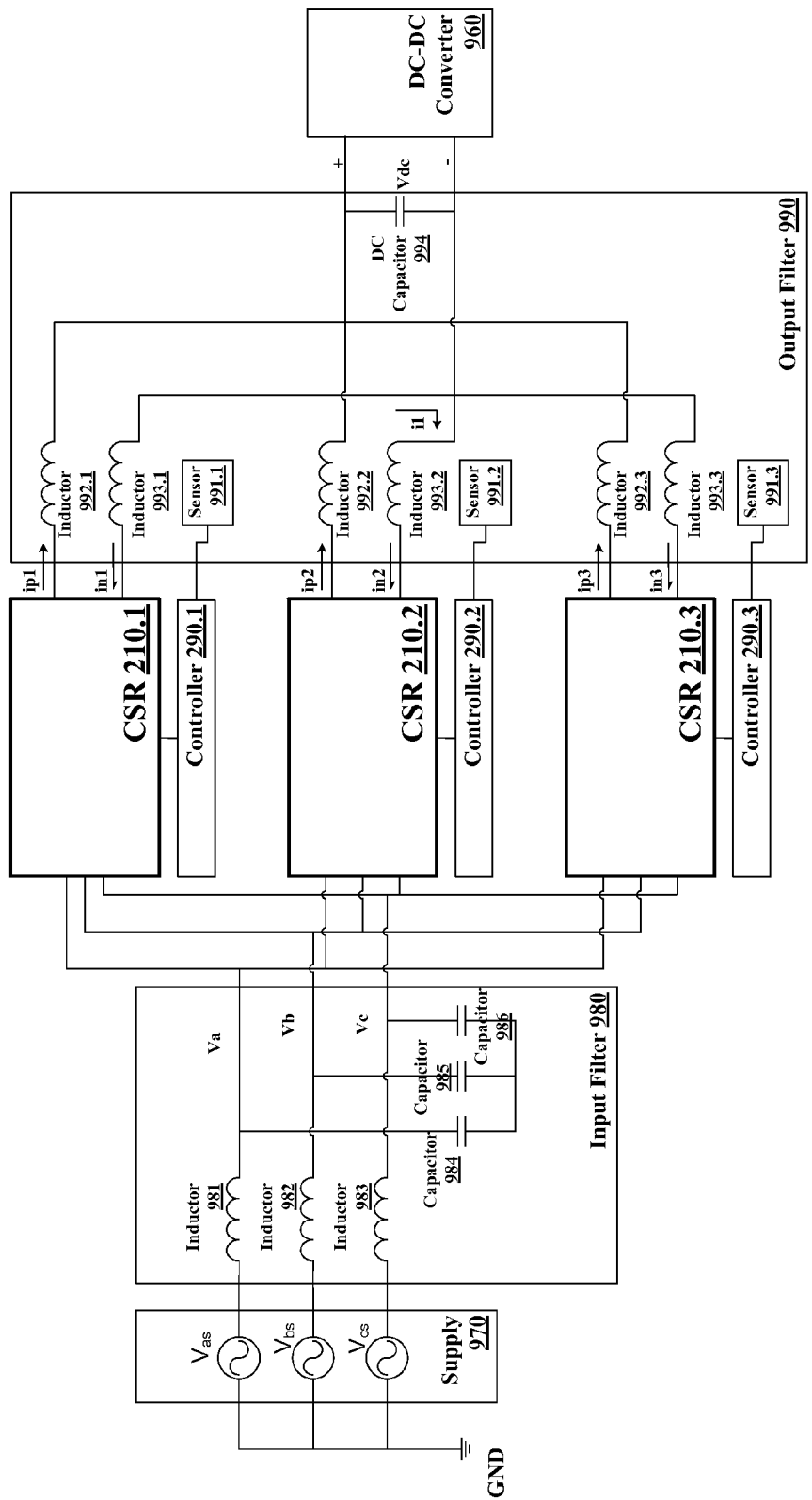
FIG. 2 illustrates another converter according to an embodiment of the present disclosure.

According to the embodiments of the present disclosure in FIG. 2, a three-phase alternating current (AC) to direct current (DC) converter 200 may include a three-phase AC filter (input filter) 980 receiving a three-phase AC power supply 970. A plurality of substantially identical three-phase current source rectifiers (CSR) (here shown with 3 CSR's 210.1-210.3) may be connected in parallel with each other and connected to the three-phase AC filter 980. An output filter 990 may be connected to the three-phase CSR's 210.1-210.3 to generate a DC output Vdc. The DC output Vdc may be further converted by a DC-DC converter 960, for specific applications or utilities, such as server power supplies.

In other words, the CSR's 210.1-210.3 receive the same input, the three filtered AC inputs (Va, Vb, and Vc) from the three-phase AC filter 980, and the output of the CSR's 210.1-210.3 are tied together to feed the DC output Vdc.

The output filter 990 may include a DC capacitor 994 and three pairs of inductors, 992.1-992.3 and 993.1-993.3 for positive lines and negative lines of corresponding CSR's 210.1-210.3.

The configuration illustrates a common DC capacitor 994. Alternatively, separate DC capacitors may be implemented for each CSR in parallel, or additional capacitors and/or other filter configurations may be used.

Sensors 991.1-991.3 (or a single sensor) may measure the voltages of the three filtered AC inputs (Va, Vb, and Vc), a voltage of the DC output Vdc and currents (ip1 through ip3 and in1 through in3) through the positive line and the negative line of each of the plurality of three-phase CSR's 210.1-210.3. This may allow the controllers 290.1-290.3 to determine whether any of the currents are imbalanced. In theory, the CSRs are substantially identical to each other. Thus, any current (ip1 through ip3 and in1 through in3) not matching with other currents indicate imbalance and circulating current.

Controllers 290.1-290.3 (or a single controller) may generate control signal sequences to selectively turn on the switches 111.1-111.6 of each of the plurality of three-phase CSR's 210.1-210.3 to have one zero-state in each of a plurality of a switching period within the present phase sector.

Controllers 290.1-290.3 may generate control signal sequences for each of the plurality of three-phase CSR's 210.1-210.3 to be substantially identical to each other, given that the three-phase CSR's 210.1-210.3 are substantially identical to each other and receive the same inputs.

Controllers 290.1-290.3 may adjust duration of the zero-state of the control signal sequences of at least one of the plurality of three-phase CSRs to compensate for current flowing between the plurality of three-phase CSRs 210.1-210.3, i.e. the circulating currents (for example i1 flowing from the negative line of CSR 210.1 to the negative line of CSR 210.2, in FIG. 2).

Controllers 290.1-290.3 may control the duration of the zero-state of the control signal sequences based upon the voltage of the DC output and the currents through the positive line and the negative line of each of the plurality of three-phase CSRs 210.1-210.3.

Controllers 290.1-290.3 may include a processor, a Space Vector Modulator (SVM), a memory storing instructions and historical performance data of the converter, A/D converters, digital signal processor (DSP), etc. (not shown).

Controllers 290.1-290.3 may use a master-follower control configuration to balance the output current distribution of the parallel CSRs 210.1-210.3. At the same time, system redundancy may be implemented.

By correcting zero state duration based on modulation scheme, the circulating current is suppressed without introducing additional power losses, and both positive and negative circulating currents are balanced.

For example, if CSR 210.1 is designated as Master, then CSR's 210.2 and 210.3 may be designated as Followers. Controller 290.1 may act as Master CSR controller, which may include control for DC voltage feedback control loop based upon Vdc deviation from a predetermined reference voltage Vref, as well as DC current feedback control loop based upon current measured in the positive and negative lines. The other controllers 290.2 and 290.3 may act as Follower CSR controllers, which may include only DC current feedback control loop based upon current measured in the positive and negative lines in the respective follower CSR as compared to reference current from the master CSR. If the master CSR 210.1 fails, controller 290.1 may disable the control of CSR 210.1 and relinquish Master status to one of the Follower CSR controllers 290.2 or 290.3. Then only CSRs 210.2 and 210.3 will function in the converter to balance the load of DC output. This may achieve redundancy, maximize switching efficiency, and reduce circulating current.

FIG. 2 illustrates 3 parallel CSRs. However, more or less numbers of CSRs in parallel configuration are also possible using the same design scheme.

With 480 V AC input line-to-line voltage, a CSR may achieve 400 V DC output with a single power conversion stage. Moreover, it may provide a wide output voltage control range, and allows for current limiting in case of an output short circuit. High full load efficiency of CSRs may be useful for data center power supplies.

It is a popular choice to parallel power converters to achieve higher output power. Compared to a single high power converter, paralleled converters will bring system redundancy through (N+1) configuration for power supply systems, as well as easy implementation of converter power management.

In paralleled CSR modules, the schemes of output power sharing and circulating current limitation need to be provided.

Connecting of converters directly in parallel to a common load can eliminate heavy transformers, this may lead to circulating current among converter modules, which will increase power loss, saturate inductors, overstress or even damage power devices. The active control method is preferred to reduce circulating current without using passive components. A free-wheeling diode across each of the DC links may conduct DC current during a controlled zero state to reduce power device conduction and switching loss.

As the front-end stage of a data center power supply system based on high voltage DC distribution architecture, the output voltage of the front-end rectifier needs to be controlled to 400 V DC. So the control algorithm of a single CSR may include the outer DC voltage control loop and inner DC current control loop. In the outer DC voltage control loop, the DC voltage on the DC capacitor 994 is fed back and compared to Vref to generate the DC current reference for the inner DC current control loop. In the DC current control loop, the DC current measured in an inductor in the output filter 990 is fed back to a controller to generate a duty cycle.

A master CSR controller may specify the output voltage of paralleled follower CSRs and provide the output current reference for its DC current loop, which is the same with single CSR control algorithm. The follower CSRs may be designed to be current followers to achieve a fast dynamic response. It only has a DC current loop whose reference is the output DC current of the master CSR. With this scheme, each follower CSR module's output current follows the output current of the master CSR, and output power balancing among paralleled CSRs can be achieved. For each CSR module, an input filter current compensation unit may be used to generate the compensation duty cycles, to be added to the duty cycle calculation to adjust to power factor.

Paralleling three-phase CSR's directly without using an isolation transformer will result in circulating currents, such as i1, caused by the difference of the CSRs' common-mode voltages (CMV). The CMV in a two paralleled CSRs system is given by (3). The CMV magnitude is increased by the zero states during switch periods in each CSR and induces higher circulating current.

For a single CSR implementation in a converter, CMV does not induce any current because physically there is no such current path. In the paralleled CSRs system, CMV and circulating current are zero under ideal conditions. However, CMV will not be zero in real applications, due to the non-ideal switch, unequal DC-link impedance, and the difference of duty cycles of different CSR modules. The circulating currents are superimposed to DC-link currents, leading to current unbalance among paralleled converter modules, but do not contribute to the output current of the whole system. Thus, circulating currents pose as inefficiencies.

For the control algorithm of paralleled CSR's, only the current on the positive line, ipj (j=1, 2, . . . ) is controlled in each CSR. Since the follower CSRs' positive DC-link currents follow the master converter's positive line current, ipj are kept balanced. However, the currents on negative lines, inj (j=1, 2, . . . ) are not controlled, and unbalance currents will appear in the negative lines, caused by circulating current (such as i1) among paralleled CSR's.

To eliminate circulating current and balance negative line (DC-link) currents, the balance control for negative line currents is necessary to be added in the control algorithm for single CSRs, which only controls positive line currents. Since the DC-link current asymmetry is caused by ΔVCM, a voltage correction, which has the same absolute value of ΔVCM but opposite sign, needs to be introduced. This voltage correction is generated by adjusting the zero state duration with the correction value Δt, based on the modulation scheme used for high efficiency CSR.

FIG. 3 illustrates a plot of a three-phase AC supply's voltages as divided into twelve phase sectors in a single cycle of the three-phase AC supply according to an embodiment of the present disclosure.

Figure 4:
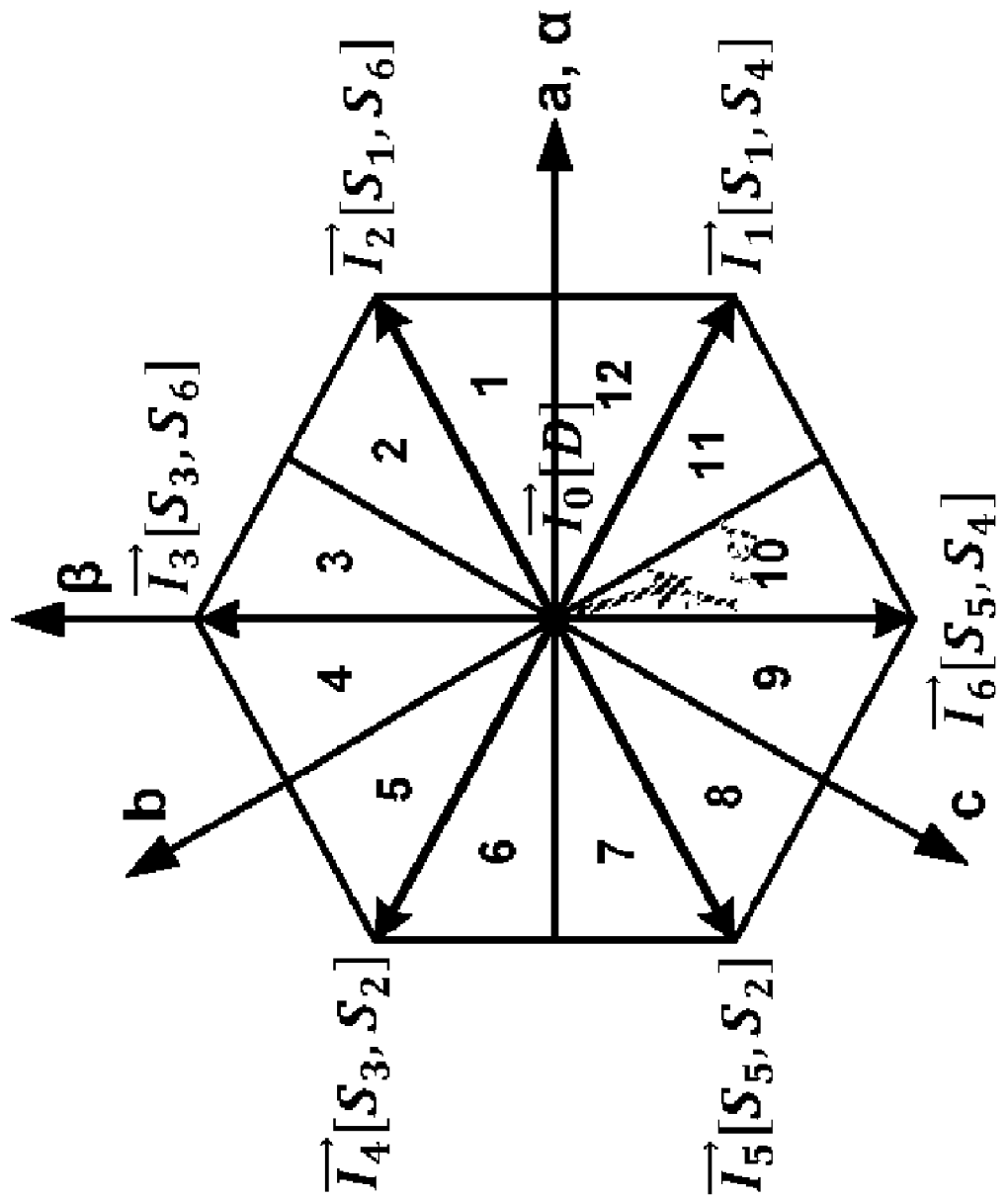
FIG. 4 illustrates a control vector space diagram of a CSR according to an embodiment of the present disclosure.

FIG. 4 illustrates a control vector space diagram of a CSR according to an embodiment of the present disclosure.

Figure 5:
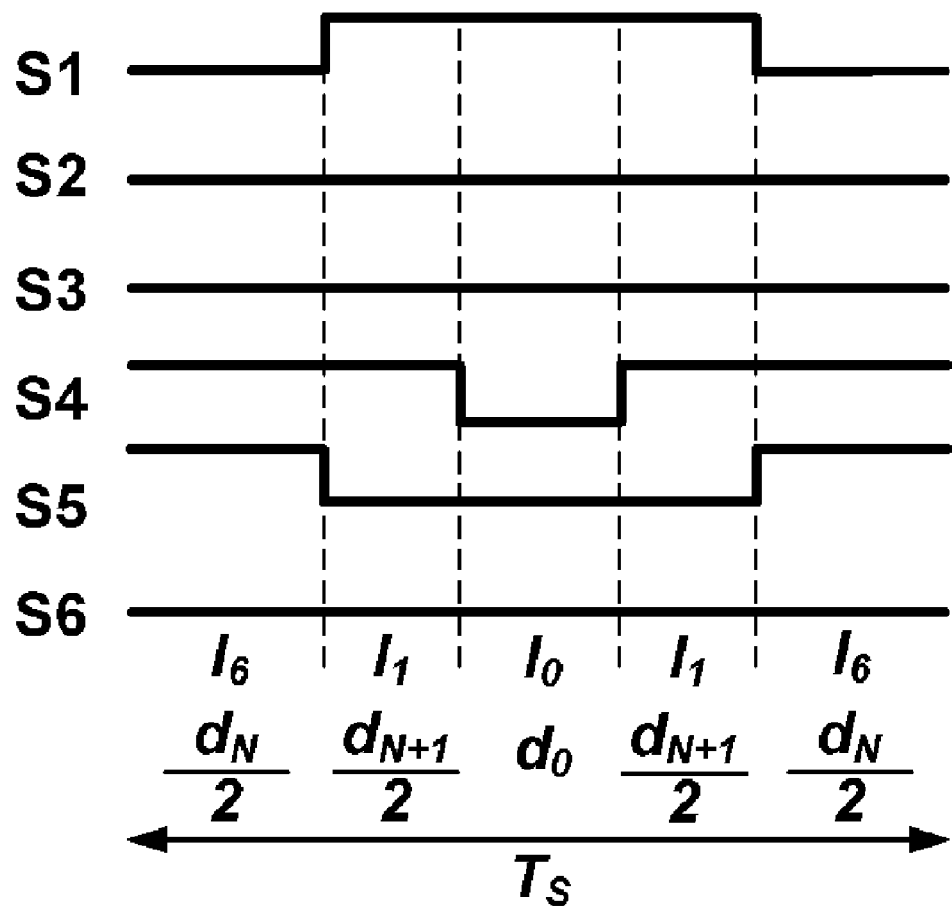
FIG. 5 illustrates exemplary control signal consequences of a switching period Ts in phase sector 10 for a CSR according to an embodiment of the present disclosure.

FIG. 5 illustrates exemplary control signal consequences of a switching period Ts in a phase sector 10 for a CSR according to an embodiment of the present disclosure.

For each CSR module in a paralleled system, a switching loss optimized (SLO) modulation scheme is used to reduce power devices' switching losses, to obtain the lowest power loss and increase three-phase current source converters' efficiency. The SLO modulation is based upon a symmetric space vector pulse width modulation (SVPWM) with 12 sectors, as shown in FIGS. 3 and 4. The space vectors are arranged so that the average switching voltage is lowest in symmetric modulation schemes. In sector 10, for example, the vector, commutating with zero vector ($I_0$), is $I_1$ not $I_6$ because the absolute value of the line-to-line voltage Vab is lower than Vbc in sector 10.

FIG. 5 illustrates the gate signals of six active devices in a single CSR in one switching period (Ts) in sector 10. The zero vectors are realized by conducting the free-wheeling diode D instead of a phase-leg, to reduce conduction loss and avoid switching of active switches.

Figure 6:
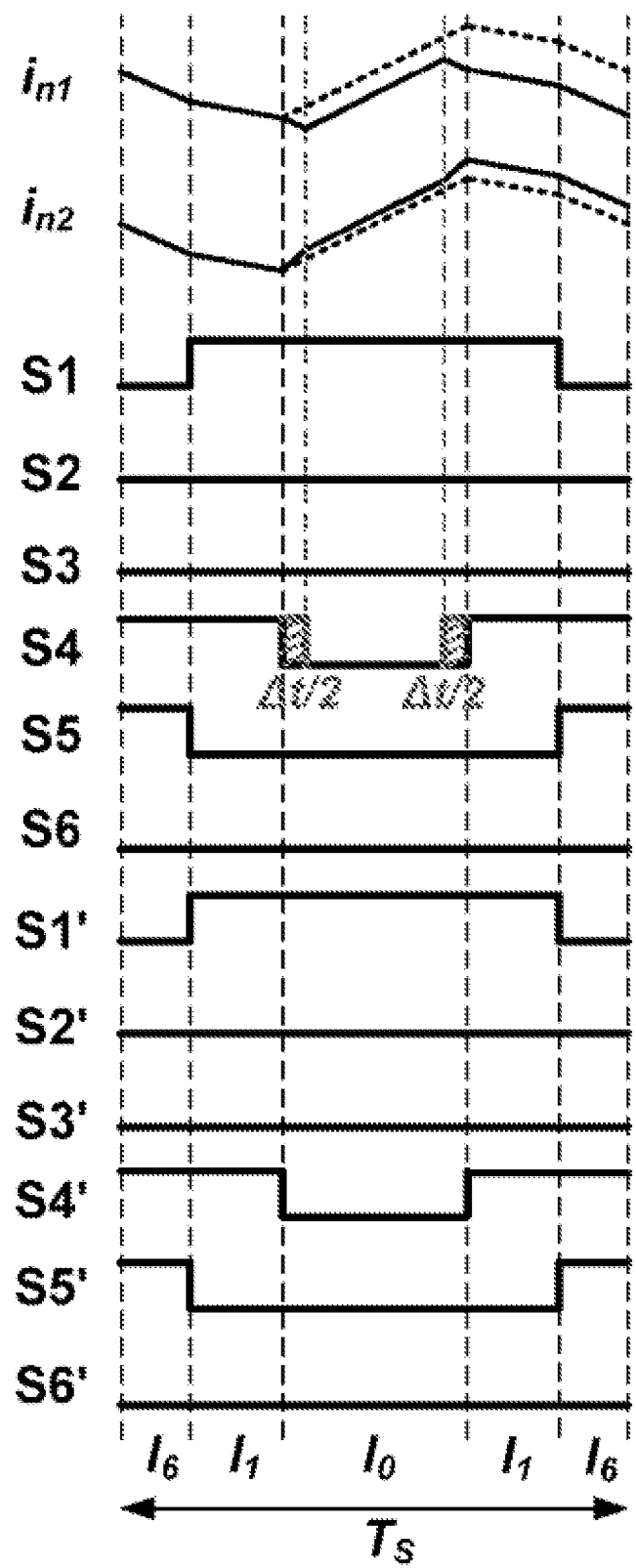
FIG. 6 illustrates exemplary control signal consequences of a switching period Ts phase sector 10 for two CSRs in a parallel configuration according to an embodiment of the present disclosure.

FIG. 6 illustrates exemplary control signal consequences of a switching period Ts in a phase sector 10 for two CSRs in parallel configuration according to an embodiment of the present disclosure.

In symmetric SVPWM in FIG. 6, the duration correction of zero state Δt for DC-link current balance is arranged between zero state and active state. As a result, the zero state duration changes from the original value t0 to (t0+Δt), shown in FIG. 6.

S1-S6 represent control signals for a CSR 210.1, for example, and S1'-S6' represent control signals for another CSR 201.2 in parallel.

For two paralleled CSRs, zero state duration correction takes place in one converter. $d_N$, $d_{N+1}$ and $d_0$ are duty cycles of two active switching state vectors and zero vector respectively, in each sector, and Δd=Δt/Ts, where Ts is the switching period duration. Based on (3), the generated voltage correction ΔV by inserting Lit in sector 10 can be achieved by $$\Delta V = (vp1 + vn1) - (vp2 + vn2)$$
$$= \begin{bmatrix} (d_0 + d_{N+1})V_A + d_{N+1}V_c + \\ (d_0 - \Delta d)V_A + (d_0 + \Delta d + d_{N+1})V_B \end{bmatrix} -$$
$$[(d_0 + d_{N+1})V_A + d_N V_C + d_0 V_A + (d_N + d_{N+1})V_B]$$
$$= -\Delta d(V_A - V_B)$$

Figure 7:
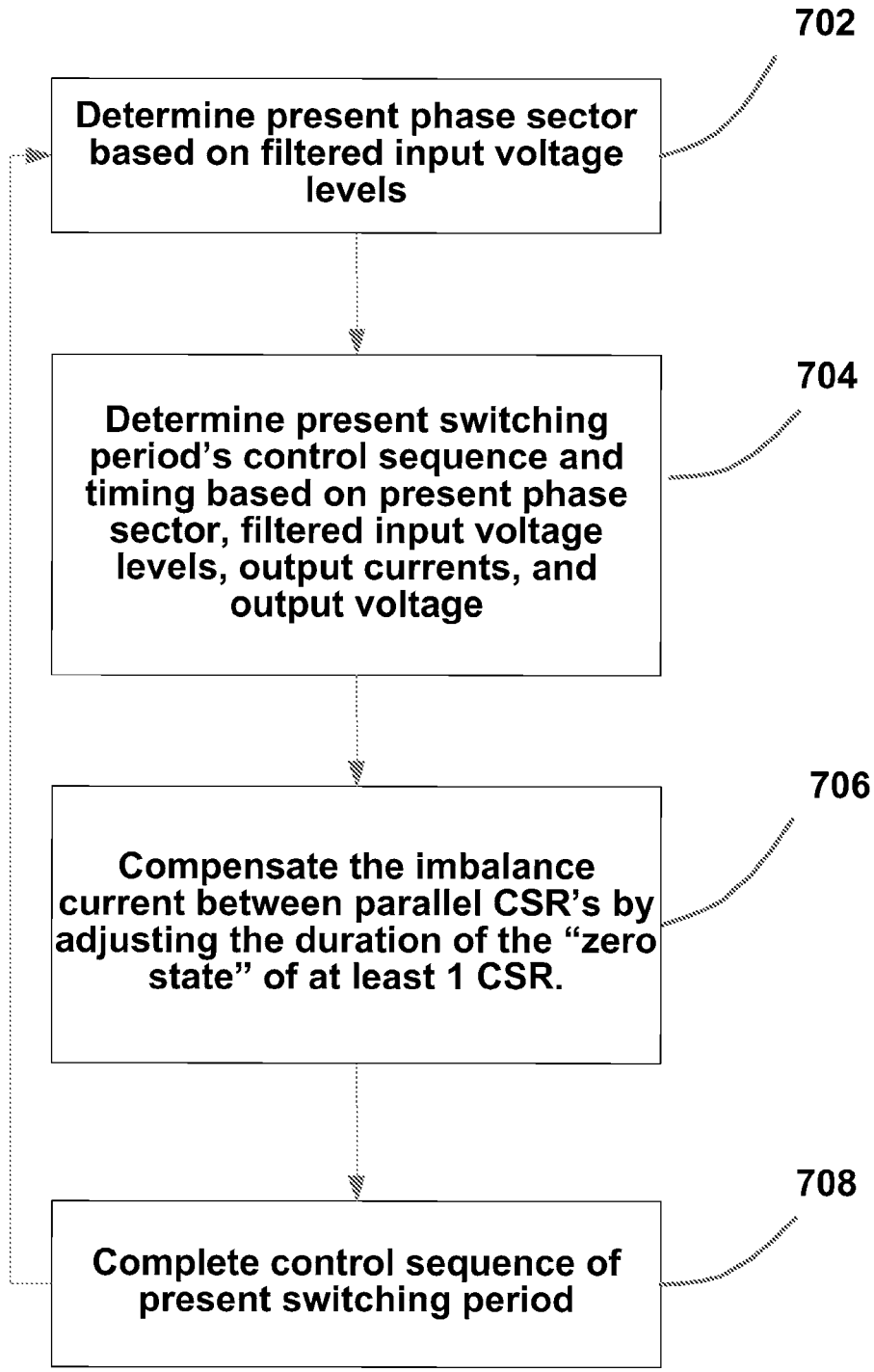
FIG. 7 illustrates a method of controlling the converter according to an embodiment of the present disclosure.

During Δt, one CSR is in a zero state and another CSR is in an active state. In sector 10 as an example, the voltages of vp1 vn1 vp2, vn2 are $V_A$, $V_B$, $V_A$, $V_A$ respectively. The voltage difference is generated between vn1 and vn2. As a result, the DC inductor current change rate will be influenced, as shown in FIG. 7 (showing modulation in a switching period of a phase sector 10 and negative DC-link currents in1 and in2 waveforms), and the DC-link currents' symmetry can be realized. Since no more switching actions are added in a switching period and current commutation sequence is not changed, no additional loss is introduced by this control.

The zero state duration correction Δt can be obtained by,
Δt=(-idc/n-in1)*C, where idc is the load current, n is the number of paralleled CSRs, and C is a multiplier factor, which may be predetermined or adjusted by controllers.

The drawback of zero state duration correction for DC-link current balance is that the application of this method is limited by modulation index. With large modulation index, the zero state may be very short, and the expected Δt may not be obtained since Δt<t0. The maximum modulation index allowed will depend on the value of circulating current.

This control structure can also be extended to an n paralleled CSR system. The DC-link current balance control action needs to be applied to (n−1) CSRs. For example, for 3 parallel CSRs, 2 CSRs may need to adjust their zero-state durations to fully minimize circulating current and balance the currents between the CSRs.

Alternatively, however, it is possible that only one or a few of the CSRs are causing the mismatching VCM (or only 1 or 2 CSRs have the VCM outliers), and thus, only a few CSRs may need to be adjusted in their zero-state durations. This might not fully minimize circulating current, but it may be desirable to skip some current balance control on some CSRs, if some of the VCM mismatches are too small or too insignificant in effect to be adjusted. Furthermore, the CSR applying the current balance control action may need to be selected. Controllers, for example, may monitor the CSRs and determine which CSR may need the zero-state adjustment most, and apply the adjustment to only the CSRs that are determined to have VCM exceeding some level of deviation.

Based on the control scheme above, the CSR modules can be added or removed from the system without the system shutting down. As a result, system redundancy can be achieved which is required by data center power supplies.

FIG. 7 illustrates a method 700 of controlling the converter according to an embodiment of the present disclosure.

At block 702, determining, by a controller, a present phase sector from a plurality of phase sectors of three filtered AC inputs.

At block 704, determining the present switching period's control sequence and timing based on present phase sector, filtered input voltage levels, output currents, and output voltage.

At block 706, compensating the imbalance current between parallel CSRs by adjusting the duration of the "zero state" of at least 1 CSR.

At block 708, completing control sequence of present switching period.

Accordingly, with the output current distribution control, a master-follower control, the output power of paralleled CSRs is balanced. By detecting circulating current combining with the used modulation scheme, the zero state duration correction is calculated. Both positive and negative DC-link currents symmetry can be realized by adjusting the zero state with calculated duration correction.

This method does not add more switching actions and will not introduce additional losses. The simulation results show the performance of the proposed control scheme to balance DC-link currents, and verify that the method can be applied to n paralleled CSRs systems, with system redundancy.

It is appreciated that the disclosure is not limited to the described embodiments, and that any number of scenarios and embodiments in which conflicting appointments exist may be resolved.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means and embodiments, the disclosure is not intended to be limited to the particulars disclosed; rather the disclosure extends to all functionally equivalent structures, methods, and uses such as are within the scope of the appended claims.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A three-phase alternating current (AC) to direct current (DC) converter comprising:
    a three-phase AC filter receiving a three-phase AC power supply;
    a plurality of three-phase current source rectifiers (CSRs) connected in parallel with each other and connected to the three-phase AC filter; and
    an output filter connected to the plurality of three-phase CSRs to generate a DC output, wherein
        each of the plurality of three-phase CSRs comprises six switches and a free-wheeling diode,
        each of the six switches comprises a MOSFET and a diode connected in series,
        each of three filtered AC inputs from the three-phase AC filter is connected via a switch of the six switches to selectably send current into a positive line, and each of three filtered AC inputs from the three-phase AC filter is connected via another switch of the six switches to selectably receive current from a negative line,
        the free-wheeling diode has a cathode connected to the positive line and an anode connected to the negative line,
        the plurality of three-phase CSRs are controlled by a controller,
        the controller determines a present phase sector from a plurality of phase sectors of the three filtered AC inputs, a sensor measures a voltage of the DC output and currents through the positive line and the negative line of each of the plurality of three-phase CSRs, and the controller generates control signal sequences to selectably turn on the switches of each of the plurality of three-phase CSRs to have one zero-state in each of a plurality of a switching period within the present phase sector.

2. The converter of claim 1, wherein the controller adjusts a duration of the zero-state of the control signal sequences of at least one of the plurality of three-phase CSRs to compensate for a current flowing between the plurality of three-phase CSRs.

3. The converter of claim 2, wherein the controller controls the duration of the zero-state of the control signal sequences based upon the voltage of the DC output and the currents through the positive line and the negative line of each of the plurality of three-phase CSRs.

4. The converter of claim 1, wherein at least one of the MOSFET, the diode, and the free-wheeling diode is a Silicon Carbide based device.

5. The converter of claim 1, wherein at least one of the diode and the free-wheeling diode is a Schottky diode.

6. A method of controlling a three-phase alternating current (AC) to direct current (DC) converter comprising:

determining, by a controller, a present phase sector from a plurality of phase sectors of three filtered AC inputs;

measuring, by a sensor, a voltage of the DC output and currents through a positive line and a negative line of each of a plurality of three-phase current source rectifiers (CSRs);

generating, by the controller, control signal sequences to selectably turn on switches of each of the plurality of three-phase CSRs to have one zero-state in each of a plurality of a switching period within the present phase sector; and adjusting, by the controller, duration of the zero-state of the control signal sequences of at least one of the plurality of three-phase CSRs to compensate for current flowing between the plurality of three-phase CSRs, wherein the three-phase AC to DC converter comprises:

a three-phase AC filter receiving a three-phase AC power supply;

a plurality of three-phase CSRs connected in parallel with each other and connected to the three-phase AC filter; and an output filter connected to the plurality of three-phase CSRs to generate a DC output, wherein each of the plurality of three-phase CSRs comprises:

six switches; and a free-wheeling diode, wherein each of three filtered AC inputs from the three-phase AC filter is connected via a switch of the six switches to selectably send current into a positive line, and each of three filtered AC inputs from the three-phase AC filter is connected via another switch of the six switches to selectably receive current from a negative line, wherein the free-wheeling diode has a cathode connected to the positive line and an anode connected to the negative line.

7. The method of claim 6, wherein each of the six switches comprises a MOSFET and a diode connected in series.

8. The method of claim 6, wherein the plurality of three-phase CSRs are controlled by a controller.

9. The method of claim 6, wherein the controller controls the duration of the zero-state of the control signal sequences based upon the voltage of the DC output and the currents through the positive line and the negative line of each of the plurality of three-phase CSRs.

10. The method of claim 7, wherein at least one of the MOSFET, the diode, and the free-wheeling diode is a Silicon Carbide based device.

11. The method of claim 7, wherein at least one of the diode and the free-wheeling diode is a Schottky diode.

12. A non-transitory computer readable medium storing computer instructions executable by a controller controlling a three-phase alternating current (AC) to direct current (DC) converter to perform:

determining, by the controller, a present phase sector from a plurality of phase sectors of three filtered AC inputs;

measuring, by a sensor, a voltage of the DC output and currents through a positive line and a negative line of each of a plurality of three-phase current source rectifiers (CSRs);

generating, by the controller, control signal sequences to selectably turn on switches of each of the plurality of three-phase CSRs to have one zero-state in each of a plurality of a switching period within the present phase sector; and adjusting, by the controller, the duration of the zero-state of the control signal sequences of at least one of the plurality of three-phase CSRs to compensate for current flowing between the plurality of three-phase CSRs, wherein the three-phase AC to DC converter comprises:

a three-phase AC filter receiving a three-phase AC power supply;

a plurality of three-phase CSRs connected in parallel with each other and connected to the three-phase AC filter; and an output filter connected to the plurality of three-phase CSRs to generate a DC output, wherein each of the plurality of three-phase CSRs comprises:

six switches; and a free-wheeling diode, wherein each of three filtered AC inputs from the three-phase AC filter is connected via a switch of the six switches to selectably send current into a positive line, and each of three filtered AC inputs from the three-phase AC filter is connected via another switch of the six switches to selectably receive current from a negative line, wherein the free-wheeling diode has a cathode connected to the positive line and an anode connected to the negative line.

13. The non-transitory computer readable medium of claim 12, wherein each of the six switches comprises a MOSFET and a diode connected in series.

14. The non-transitory computer readable medium of claim 12, wherein the plurality of three-phase CSRs are controlled by a controller.

15. The non-transitory computer readable medium of claim 12, wherein the controller controls the duration of the zero-state of the control signal sequences based upon the voltage of the DC output and the currents through the positive line and the negative line of each of the plurality of three-phase CSRs.

* * * * *